United States Patent [19]

Francel et al.

[11] Patent Number: 4,537,862
[45] Date of Patent: * Aug. 27, 1985

[54] LEAD-FREE AND CADMIUM-FREE GLASS FRIT COMPOSITIONS FOR GLAZING, ENAMELING AND DECORATING

[75] Inventors: Josef Francel; Uriah Horn, both of Toledo; Daniel R. Stewart, Maumee, all of Ohio

[73] Assignee: Owens-Illinois, Inc., Toledo, Ohio

[ * ] Notice: The portion of the term of this patent subsequent to May 1, 2001 has been disclaimed.

[21] Appl. No.: 604,560

[22] Filed: Apr. 27, 1984

Related U.S. Application Data

[63] Continuation-in-part of Ser. No. 392,974, Jun. 28, 1982, Pat. No. 4,446,241.

[51] Int. Cl.³ .................................................. C03C 1/00
[52] U.S. Cl. ....................................... 501/14; 501/21; 501/25; 501/30; 501/31; 501/78

[58] Field of Search ....................... 501/78, 27, 21, 25, 501/64, 31, 14, 30

[56] References Cited

U.S. PATENT DOCUMENTS

| Re. 29,388 | 9/1977 | Atkinson | 501/64 |
| 4,088,023 | 5/1978 | Berleue | 501/31 |
| 4,446,241 | 5/1984 | Francel et al. | 501/78 |

Primary Examiner—Helen M. McCarthy
Attorney, Agent, or Firm—John R. Nelson

[57] ABSTRACT

Glass frit compositions are shown that are lead-free, cadmium-free, and zinc-free, the compositions having improved chemical resistance, especially acid resistance (acetic acid) of a loss of generally less than about 1.9% by weight. The compositions contain $B_2O_3$, $SiO_2$, $ZrO_2$ and rare earth oxides, the weight ratio of $ZrO_2$ to rare earth oxides being critical and being about 1/1 to 1.4/1.

17 Claims, No Drawings

LEAD-FREE AND CADMIUM-FREE GLASS FRIT COMPOSITIONS FOR GLAZING, ENAMELING AND DECORATING

This application is a continuation-in-part of U.S. patent application Ser. No. 392,974 filed June 28, 1982 now U.S. Pat. No. 4,446,241.

BACKGROUND OF THE INVENTION

The present invention relates to lead-free, cadmium-free and zinc-free glass compositions for use in glazing, enameling and for decorating food service ware such as glass tumblers and chinaware. The disclosure of the above identified Ser. No. 392,974 is incorporated by reference, the disclosure including methods of making and using the glass frit compositions with no lead, cadmium or zinc.

There is a need for improvement in the alkali and acid resistance, especially the acid resistance over the glass frit composition disclosed in Ser. No. 392,974.

OBJECTS OF THE INVENTION

It is an object of the present invention to provide improved lead-free, cadmium-free, and zinc-free glass frit compositions having improved chemical resistance including an alkali resistance of a loss of less than about 1% by weight and an acid resistance (acetic acid) of a loss less than about 1.9% by weight.

It is an object of the present invention to provide a lead-free, cadmium-free and zinc-free borosilicate glass frit composition having relatively high amounts of zirconia and a rare earth oxide including $La_2O_3$, the composition having a critical ratio of zirconia to rare earth oxide to provide a low melting glass for decorating glass that has improved chemical resistance and one that can provide a greater number of decorated tumblers per pound of glass frit.

THE INVENTION

The present invention provides a glass frit composition that has improved chemical resistance including an alkali resistance of a loss of generally less than about 1% and preferably less than about 0.5% by weight and an acid resistance (acetic acid) of a loss of generally less than about 1.9% and preferably less than about 1.8 or 1.7% by weight.

The present invention provides a glass frit composition having a fiber softening point of at least about 535° C., the composition being free of lead, cadmium, and zinc, the composition consisting essentially of the following components in approximate weight percents:

| Component | % |
| --- | --- |
| $SiO_2$ | 25–32 |
| $B_2O_3$ | 25–32 |
| $ZrO_2$ | 10–18 |
| Rare earth oxide | 10–18 |
| $Li_2O$ | 0–9 |
| $Na_2O$ | 0–9 |

-continued

| Component | % |
| --- | --- |
| $K_2O$ | 0–5 |
| SrO | 0–6 |
| F | 0–3 |
| CaO | 0–3 |
| $SnO_2$ | 0–2 |
| $WO_3$ | 0–10 | in which the ratio of $ZrO_2$ to rare earth oxide is about 1:1 to 1.4:1, the amount of $ZrO_2$+rare earth oxide is about 20 to 33 the amount of $Li_2O$, $K_2O$ and $Na_2O$ is about 1 to 10. The rare earth oxide is preferably a mixture of rare earth oxides, including for the best results, a mixture of $La_2O_3$ and $CeO_2$. Excellent results have been obtained by using bastnasite as a raw material ingredient, the bastnasite providing the glass frit composition with $La_2O_3$, $CeO_2$, $Nd_2O_3$ and $Pr_2O_3$.

The rare earth oxide can be a mixture of $La_2O_3$ and $CeO_2$ in which there is generally about 5 to 40 parts by weight of $La_2O_3$ and about 20 to 60 parts by weight of $CeO_2$, the preferred amounts being about 20 to 35 parts of $La_2O_3$ and about 25 to 45 parts by weight of $CeO_2$. Other useful rare earth oxides are $Nd_2O_3$ and $Pr_2O_3$. The other rare earth oxides are useful such as oxides of Sm, Tb and Tm in amounts, when used, often only about 1 to 10% by weight of the $La_2O_3$ or $CeO_2$.

As previously indicated, it has been found that there is a critical weight ratio of about 1/1 to 1.4/1 of $ZrO_2$ to rare earth oxide, with the best results being obtained with a ratio of $ZrO_2$ to rare earth oxide of about 1.1 to 1.3/1.

As previously mentioned, the amounts of $ZrO_2$ and rare earth oxide are relatively high, generally being about 20 to 33 weight percent and preferably being about 29 or 30 to 32 or 33.

As disclosed in Ser. No. 392,974, the lead-free, cadmium-free and zinc-free glass frit composition numbers 24 and 25 have the following components in approximate percent by weight:

| | % by Weight | |
| --- | --- | --- |
| Component | 24 | 25 |
| $B_2O_3$ | 30 | 30 |
| $Li_2O$ | 7 | 7 |
| $SiO_2$ | 28 | 30 |
| $ZrO_2$ | 18 | 16 |
| $La_2O_3$ | 15 | 15 |
| CaO | 2 | 2 |
| F.S.P. °C. (Fiber Softening Point) | 606 | 595 |
| Flow | 1.02 | 1.06 |
| Stress | 630 C. | 415 C. |

As set forth in Ser. No. 392,974 and as well known in the art, raw batch glass compositions were melted and fired generally at about 2200° F. for 2 hours. The melt was quenched to produce the glass frit composition. The glass frit compositions 1–11 shown hereinafter, with the components given in weight percent, were made, used and tested as follows:

TABLE 1

| | 1 | 2 | 3 | 4 | 5 | 6 | 7 | 8 | 9 | 10 | 11 |
| --- | --- | --- | --- | --- | --- | --- | --- | --- | --- | --- | --- |
| Alkalies | 0.18 | 0.00 | 0.64 | 0.00 | 0.17 | 0.18 | 0.36 | 0.00 | 0.00 | 0.00 | 0.31 |
| Acids (Acetic) | 0.14 | 0.52 | 1.12 | 1.17 | 1.64 | 1.25 | 1.05 | 1.86 | 1.62 | 1.82 | 1.57 |
| Expansions (0 to 300° C.) | 72.1 | 71.2 | 74.2 | 77.6 | 77.4 | 74.0 | 74.4 | 75.8 | 76.5 | 77.6 | 75.6 |
| $SiO_2$ | 27 | 28 | 30 | 30 | 27 | 28 | 27 | 30 | 27 | 27 | 27 |

TABLE 1-continued

|  | 1 | 2 | 3 | 4 | 5 | 6 | 7 | 8 | 9 | 10 | 11 |
|---|---|---|---|---|---|---|---|---|---|---|---|
| $B_2O_3$ | 29 | 30 | 30 | 30 | 29 | 28 | 27 | 30 | 29 | 29 | 29 |
| $ZrO_2$ | 18 | 18 | 16 | 16 | 18 | 15 | 14 | 10 | 17 | 15 | 18 |
| $Li_2O$ | 7 | 6 | 7 | 8 | 9 | 6 | 6 | 9 | 8 | 8 | 8 |
| SrO | 4 | 3 | 0 | 0 | 2 | 0 | 0 | 0 | 6 | 6 | 5 |
| $La_2O_3$ | 15 | 15 | 15 | 15 | 15 | 14 | 13 | 10 | 13 | 15 | 13 |
| F | 0 | 2 | 2 | 2 | 0 | 1 | 1 | 0 | 0 | 0 | 0 |
| CaO | 0 | 0 | 2 | 0 | 0 | 2 | 2 | 0 | 0 | 0 | 0 |
| $SnO_2$ | 0 | 0 | 0 | 0 | 0 | 0 | 0 | 3 | 0 | 0 | 0 |
| $WO_3$ | 0 | 0 | 0 | 1 | 0 | 6 | 10 | 8 | 0 | 0 | 0 |

It can be seen that the glass frit compositions exhibit an unusual balance of properties including chemical resistance, especially acid resistance, the acid resistance tests using acetic acid.

In Table 2, the results of glass frit compositions 12-14 are shown, the components being given in parts by weight. The mixture of rare earth oxides was provided by the use of bastnasite as a raw batch material.

TABLE 2

|  | 12 | 13 | 14 |
|---|---|---|---|
| Alkalies | 0.70 | 0.00 | 0.30 |
| Acids | 1.17 | 1.42 | 1.84 |
| Expansions | 74 | 72 | 721 |
| (0 to 300° C.) |  |  |  |
| $SiO_2$ | 30 | 30 | 30 |
| $B_2O_3$ | 30 | 32 | 32 |
| $ZrO_2$ | 16 | 16 | 16 |
| $LiO_2$ | 0 | 0 | 0 |
| $Na_2O$ | 9 | 9 | 9 |
| F | 2 | 4 | 2 |
| Rare Earth Oxide | 15 | 15 | 15 |
| (Approx. 42 parts by wt. $CeO_2$, |  |  |  |
| 29 $La_2O_3$, 12 $Nd_2O_3$, 4 $Pr_2O_3$) |  |  |  |

The raw batch materials for approximately a 212 gram batch for glass frit composition No. 12 are given below to illustrate the use of bastnasite and other low-cost batch materials.

| Raw Material | Grams of Material |
|---|---|
| Ottawa sand | 43 |
| Boric acid, anhydrous | 59 |
| Milled zircon | 47 |
| Soda ash | 22 |
| Cryolite | 11 |
| Bastnasite | 30 |

The bastnasite provided about 9 grams $La_2O_3$, 13 grams $CeO_2$, 0.6 grams $Pr_2O_3$, and 1.8 grams $Nd_2O_3$ as well as some minor amounts of $SiO_2$, CaO, BaO, SrO, F, $Fe_2O_3$ and $P_2O_5$.

As previously mentioned, the outstanding glass frit compositions have a fiber softening point of at least about 535° C. up to about 609° or more, say, to about 615° to 620° C. The preferred coefficient of thermal expansion (0° to 300° C. $\times 10^{-7}$/°C.) as seen in Table 2 is about 72 to 74, other useful coefficient of thermal expansion, as seen in Table 1, being about 71 to 77 or 78. As stated in Ser. No. 392,974, the acid resistance is measured by a standard test using 4% by weight acetic acid for 24 hours at room temperature. Also as stated in Ser. No. 392,974 the alkali resistance is a test using 5% sodium pyrophosphate at 60° C. for 8 hours.

What is claimed is:

1. A glass frit composition having a fiber softening point of at least about 535° C., the composition being free of lead, cadmium, and zinc, the composition consisting essentially of the following components in approximate weight percents:

| Component | % |
|---|---|
| $SiO_2$ | 25-32 |
| $B_2O_3$ | 25-32 |
| $ZrO_2$ | 10-18 |
| Rare earth oxide | 10-18 |
| $Li_2O$ | 0-9 |
| $Na_2O$ | 0-9 |
| $K_2O$ | 0-5 |
| SrO | 0-6 |
| F | 0-3 |
| CaO | 0-3 |
| $SnO_2$ | 0-2 |
| $WO_3$ | 0-10 | in which the ratio of $ZrO_2$ to rare earth oxide is about 1:1 to 1.4:1, the amount of $ZrO_2$+rare earth oxide is about 20 to 33 and the amount of $Li_2O$, $K_2O$ and $Na_2O$ is about 1 to 10, the composition having an alkali resistance of less than about 1% (5% sodium pyrophosphate at 60° C. for 8 hours) and an acid resistance of less than about 1.9% (4% by weight acetic acid for 24 hours at room temperature).

2. A composition as defined in claim 1 in which the rare earth oxide is a mixture of rare earth oxides.

3. A composition as defined in claim 1 in which the rare earth oxide is a mixture of $La_2O_3$ and $CeO_2$.

4. A composition as defined in claim 1 in which the rare earth oxide is a mixture of rare earth oxides of from about 5 to 40 parts by weight of $La_2O_3$ and about 20 to 60 parts by weight of $CeO_2$.

5. A composition as defined in claim 1 in which the rare earth oxide is a mixture of rare earth oxides of $La_2O_3$, $CeO_2$, $Nd_2O_3$ and $Pr_2O_3$.

6. A composition as defined in claim 1 in which the rare earth oxide is a mixture of rare earth oxides of $La_2O_3$, $CeO_2$, $Nd_2O_3$ and $Pr_2O_3$ from bastnasite as a raw batch material.

7. A composition as defined in claim 1 in which the ratio of $ZrO_2$ to rare earth oxide is about 1.1/1 to 1.3/1, and the amount of $ZrO_2$+rare earth oxide is about 30 to 33.

8. A composition as defined in claim 1 in which the composition has excellent physical and chemical properties, the coefficient of thermal expansion (0° to 300° C. $\times 10^{-7}$/°C.) being about 71 to 78.

9. A composition as defined in claim 1 in which the composition is as follows:

| Component | % |
|---|---|
| $SiO_2$ | 27 |
| $B_2O_3$ | 29 |
| $ZrO_2$ | 18 |
| $Li_2O$ | 7 |
| SrO | 4 |

-continued

| Component | % |
|---|---|
| La$_2$O$_3$ | 15. |

10. A composition as defined in claim 1 in which the composition is as follows:

| Component | % |
|---|---|
| SiO$_2$ | 28 |
| B$_2$O$_3$ | 30 |
| ZrO$_2$ | 18 |
| LiO$_2$ | 6 |
| SrO | 3 |
| La$_2$O$_3$ | 15 |
| F | 2. |

11. A composition as defined in claim 1 in which the composition is as follows:

| Component | % |
|---|---|
| SiO$_2$ | 30 |
| B$_2$O$_3$ | 30 |
| ZrO$_2$ | 16 |
| Li$_2$O | 7 |
| La$_2$O$_3$ | 15 |
| F | 2 |
| CaO | 2. |

12. A composition as defined in claim 1 in which the composition is as follows:

| Component | % |
|---|---|
| SiO$_2$ | 27 |
| B$_2$O$_3$ | 29 |
| ZrO$_2$ | 18 |
| Li$_2$O | 9 |
| SrO | 2 |
| La$_2$O$_3$ | 15. |

13. A composition as defined in claim 1 in which the composition is as follows:

| Component | % |
|---|---|
| SiO$_2$ | 30 |
| B$_2$O$_3$ | 30 |
| ZrO$_2$ | 10 |
| Li$_2$O | 9 |
| La$_2$O$_3$ | 10 |
| SnO$_2$ | 3 |
| WO$_3$ | 8. |

14. A composition as defined in claim 1 in which the composition is as follows:

| Component | % |
|---|---|
| SiO$_2$ | 27 |
| B$_2$O$_3$ | 29 |
| ZrO$_2$ | 18 |
| Li$_2$O | 8 |

-continued

| Component | % |
|---|---|
| SrO | 5 |
| La$_2$O$_3$ | 13. |

15. A glass frit composition having a fiber softening point of at least about 535° C., the composition being free of lead, cadmium, and zinc, the composition consisting essentially of the following components in parts by weight:

| Components | [Percent] Parts by Weight |
|---|---|
| SiO$_2$ | 30 |
| B$_2$O$_3$ | 30 |
| ZrO$_2$ | 16 |
| Na$_2$O | 9 |
| Rare earth oxide (bastnasite) | 15 |
| F | 2 | the composition having an alkali resistance of less than about 1% (5% sodium pyrophosphate at 60° C. for 8 hours) and an acid resistance of less than about 1.9% (4% by weight acetic acid for 24 hours at room temperature).

16. A glass frit composition having a fiber softening point of at least about 535° C., the composition being free of lead, cadmium, and zinc, the composition consisting essentially of the following components in parts by weight:

| Components | [Percent] Parts by Weight |
|---|---|
| SiO$_2$ | 30 |
| B$_2$O$_3$ | 32 |
| ZrO$_2$ | 16 |
| Na$_2$O | 9 |
| Rare earth oxide (bastnasite) | 15 |
| F | 4 | the composition having an alkali resistance of less than about 1% (5% sodium pyrophosphate at 60° C. for 8 hours) and an acid resistance of less than about 1.9% (4% by weight acetic acid for 24 hours at room temperature).

17. A glass frit composition having a fiber softening point of at least about 535° C., the composition being free of lead, cadmium, and zinc, the composition consisting essentially of the following components in parts by weight:

| Components | [Percent] Parts by Weight |
|---|---|
| SiO$_2$ | 30 |
| B$_2$O$_3$ | 32 |
| ZrO$_2$ | 16 |
| Na$_2$O | 9 |
| Rare earth oxide (bastnasite) | 15 |
| F | 2 | the composition having an alkali resistance of less than about 1% (5% sodium pyrophosphate at 60° C. for 8 hours) and an acid resistance of less than about 1.9% (4% by weight acetic acid for 24 hours at room temperature).

* * * * *